United States Patent
Killi et al.

(10) Patent No.: US 12,502,047 B2
(45) Date of Patent: Dec. 23, 2025

(54) APPARATUS FOR ROBOTIC APPLIANCES

(71) Applicant: Killis Ltd., Sheffield (GB)

(72) Inventors: Tibor Killi, Sheffield (GB); Rob Harrison, Sheffield (GB)

(73) Assignee: Killis Ltd., Sheffield (GB)

( * ) Notice: Subject to any disclaimer, the term of this patent is extended or adjusted under 35 U.S.C. 154(b) by 781 days.

(21) Appl. No.: 17/824,772

(22) Filed: May 25, 2022

(65) Prior Publication Data
US 2022/0378265 A1 Dec. 1, 2022

(30) Foreign Application Priority Data
May 28, 2021 (GB) ...................... 2107635

(51) Int. Cl.
*H02J 7/00* (2006.01)
*A47L 9/28* (2006.01)
*A47L 11/40* (2006.01)

(52) U.S. Cl.
CPC ......... *A47L 9/2873* (2013.01); *A47L 11/4011* (2013.01); *A47L 2201/02* (2013.01)

(58) Field of Classification Search
None
See application file for complete search history.

(56) References Cited

U.S. PATENT DOCUMENTS

| | | |
|---|---|---|
| 7,130,190 B1 | 10/2006 | Baker |
| 10,985,578 B1 | 4/2021 | Ardaman et al. |
| 2005/0156562 A1* | 7/2005 | Cohen .................. A47L 9/2889 320/107 |
| 2006/0085105 A1 | 4/2006 | Chiu et al. |
| 2012/0062170 A1 | 3/2012 | Li et al. |
| 2014/0175031 A1 | 6/2014 | Roberts |
| 2015/0183326 A1* | 7/2015 | Ryberg .................. B60L 53/00 320/109 |

(Continued)

FOREIGN PATENT DOCUMENTS

| | | |
|---|---|---|
| GB | 2565480 A | 2/2019 |
| JP | 2009-201276 A | 9/2009 |
| WO | WO-2018-234823 A1 | 12/2018 |

OTHER PUBLICATIONS

Extended European Seach Report dated Jan. 31, 2023 in corresponding European Application No. 22175785.9 (11 pages).

(Continued)

*Primary Examiner* — Arun C Williams
(74) *Attorney, Agent, or Firm* — Harness, Dickey & Pierce, P.L.C.

(57) ABSTRACT

An apparatus for use with a plurality of robotic appliances, the apparatus comprising a plurality of receiving spaces each configured to receive at least one robotic appliance, wherein each of the receiving spaces comprises: a shelf comprising an upper surface on which a robotic appliance can be located; a charging element configured to charge a robotic appliance when it is located on the shelf; and one or more locating formations arranged to abut said robotic appliance, such that the one or more locating formations provide support against movement of the robotic appliance when the robotic appliance is located on the shelf, wherein the one or more locating formations are provided at or above the upper surface of said shelf.

20 Claims, 6 Drawing Sheets

(56) References Cited

U.S. PATENT DOCUMENTS

2016/0372949 A1 12/2016 McCaffrey et al.
2017/0047751 A1 2/2017 Fernandes

OTHER PUBLICATIONS

Combined Search and Examination Report dated Oct. 20, 2021 in corresponding United Kingdom Application No. 2107635.1 (9 pages).
Great Britain Examination Report dated Feb. 24, 2023 in corresponding GB Application No. GB2107635.1.
Combined Search and Examination Report dated Oct. 21, 2024 in corresponding Great Britain Application No. GB2413942.0.

* cited by examiner

APPARATUS FOR ROBOTIC APPLIANCES

CROSS-REFERENCE TO RELATED APPLICATION

This application claims the benefit and priority of United Kingdom Application No. 2107635.1, filed May 28, 2021. The entire disclosure of the above application is incorporated herein by reference.

FIELD OF THE INVENTION

The present invention relates to an apparatus for use with a plurality of robotic appliances, and to a system including said apparatus and a plurality of robotic appliances.

BACKGROUND OF THE INVENTION

Robotic appliances, such as robotic vacuum cleaners, are known for treating an area autonomously, which reduces the need for manual cleaning. Often, such robotic appliances are small, battery-operated devices.

When an area to be treated is large (e.g. an airport terminal, open-plan office space, a gymnasium or sports hall) and/or includes multiple rooms (e.g. a hotel), a plurality of robotic appliances may be required to accomplish the task in an acceptable timescale and without charging in between.

When the robotic appliances have completed their task, there is a need to store the robotic appliances and to recharge them so that they are ready for use at a later date.

The present inventions seeks to overcome, or at least mitigate, one or more problems of the prior art.

SUMMARY OF THE INVENTION

According to a first aspect of the invention, an apparatus for use with a plurality of robotic appliances is provided, the apparatus comprising a plurality of receiving spaces each for receiving one or more robotic appliances.

In exemplary embodiments, the apparatus is configured for charging said plurality of robotic appliances.

In exemplary embodiments, the apparatus is configured for storing said plurality of robotic appliances.

In exemplary embodiments, the apparatus is configured for transporting said plurality of robotic appliances.

In exemplary embodiments, each receiving space comprises a shelf comprising an upper surface on which a robotic appliance can be located.

In exemplary embodiments, each receiving space comprises a charging element configured to charge a robotic appliance when it is located on the shelf.

In exemplary embodiments, each receiving space comprises one or more locating formations arranged to abut said robotic appliance, for example such that the one or more location formations provide support against movement of the robotic appliance when the robotic appliance is located on the shelf and/or act to locate the robotic appliance in a desired position on the shelf.

In exemplary embodiments, the locating formation is provided at or above the upper surface of said shelf.

Such an apparatus provides an easy means for storing, charging and/or transporting a plurality of robotic appliances (e.g. a plurality of robotic vacuum cleaners).

Having one or more locating formations at or above the upper surfaces of the shelves and which are arranged to abut a robotic appliance (e.g. a side wall/body or wheels thereof) facilitates correct location of the robotic appliances on the shelves, which reduces the chance of the robotic appliances falling off, or being knocked/damaged. Correct location of the robotic appliance on the shelf can also facilitate charging of the appliance.

In addition, the locating formations provided above the surface of at or above the surface of the shelf guard against movement of the robotic appliance whilst also enabling a variety of robotic appliances to be used with the apparatus. For example, robotic appliance models having a variety of configurations and/or or wheel positions may be supported against movement by the locating formations. If the robotic appliance were to be located, for example via apertures in a shelf configured to receive the wheels of a particular model of robotic appliance, such shelves are unlikely to be compatible with other models/configurations of robotic appliance, hence different shelves would be required for different appliances.

In some embodiments, the or each locating formation may be a wall, a rail projecting from the upper surface of the shelf, a guide rail spaced apart from the upper surface of the shelf, for example, configured to abut a side wall of a robotic appliance, or any other suitable formation.

In exemplary embodiments, the one or more locating formations extend from an upper surface of the shelf.

Having the locating formations extend from an upper surface of the shelf (e.g. being welded to the upper surface, formed by pressing or integrally cast) offers a simple means for positioning the locating formations in the receiving space.

In exemplary embodiments, the one or more locating formations extend from an underside of a shelf above.

Having the locating formations extend from an underside of a shelf above (e.g. being welded to the underside of the shelf, formed by pressing or integrally cast) offers an alternative means for positioning the locating formations in the receiving space.

In exemplary embodiments, the one or more locating formations are configured to abut the robotic appliance at a plurality of contact points.

Having a plurality of contact points facilitates locating the robotic appliance and/or supporting the robotic appliance against movement in more than one direction (e.g. lateral and/or longitudinal directions) on the shelf.

In exemplary embodiments, the robotic appliances comprise a circular profile and the plurality of contact points are spaced apart by 180 degrees or less with respect to a central point of the circular profile.

Contacting a circular robotic appliance at points spaced apart by 180 degree or less with respect to a circumference of the circular profile facilitates locating the robotic appliance on the shelf and/or supporting the robotic appliance against movement, whilst enabling easy loading and unloading of the appliances.

In exemplary embodiments, the plurality of contact points are spaced apart from each other by an angle in the range of 45 degrees to 135 degrees with respect to a central point of the circular profile.

Contacting a circular robotic appliance at points spaced apart by an angle in the range of 45 degrees to 135 degrees with respect to a circumference of the circular profile has been found to facilitate effective location of the robotic appliance and/or effective support of the robotic appliance against movement, whilst enabling easy loading and unloading of the appliances.

In exemplary embodiments, the one or more locating formations comprise a planar surface for abutment with the robotic appliance.

Having a planar surface (for example, a planar wall extending from an upper surface of the shelf) allows a variety of shapes of robotic appliance to abut against the planar surface and hence be located/supported against movement (e.g. as opposed to a locating formation which is specifically curved/shaped/contoured to match a profile of a particular robotic appliance).

In exemplary embodiments, the one or more locating formations define a pair of planar surfaces arranged at an angle between 0 and 180 degrees to each other; optionally, wherein the one or more locating formations define a pair of planar surfaces arranged at an angle between 90 and 150 degrees to each other.

Having two planar surfaces arranged at such angles to each other has been found to be effective for locating a robotic appliance and/or supporting the robotic appliance against movement, whilst enabling easy loading and unloading of the appliances. Furthermore, such angled planar surfaces have been found to be effective for locating/supporting robotic appliances of different sizes/shapes/configurations (e.g. circular robotic appliances with smaller or larger diameters).

In exemplary embodiments, the robotic appliances comprise a circular profile and wherein at least one locating formation is curved to correspond to a portion of a circumference of the circular profile;
  optionally, wherein the at least one curved locating formation defines an arc with a central angle of 180 degrees or less, optionally in the range of 45 to 135 degrees; and/or
  optionally, wherein the apparatus comprises a plurality of curved locating formations, optionally wherein each curved locating formation defines an arc with a central angle of 90 degrees or less.

Such a locating formation facilitates locating a robotic appliance on the shelf and/or supporting the robotic appliance against movement, by supporting the robotic appliance around a portion of its circumference.

In exemplary embodiments, the one or more locating formations are configured to abut a body of the robotic appliance, e.g. a side wall or top surface of the robotic appliance.

This provides a simple means for locating a robotic appliance and/or supporting the robotic appliance against movement (e.g. as opposed to alternative arrangements in which a wheel or other smaller component of the robotic appliance has to be aligned with a locating formation or aperture).

In exemplary embodiments, each shelf is angled relative to a horizontal plane when the apparatus is positioned on a horizontal surface.

Having an angled shelf ensures that a robotic appliance located on the shelf is urged downwards under the force of gravity. This inhibits the robotic appliance from falling off an upper end of the shelf.

In exemplary embodiments, the one or more locating formations are positioned such that a robotic appliance located on said angled shelf is urged towards said one or more locating formations by gravity.

In this way, the robotic appliance located on said angled shelf rests against the one or more locating formations under gravity.

In other words, positioning the locating formation(s) such that a robotic appliance is urged towards them ensures that the robotic appliance contacts the locating formations and is correctly positioned on the shelf and/or supported against movement, e.g. without the need for a user to actively position the robotic appliance against the locating formations.

In exemplary embodiments, the charging element of each receiving space comprises a docking station having one or more charging terminals, and wherein the one or more locating formations are arranged for locating a robotic appliance such that one or more charging contacts of the robotic appliance are in contact with the one or more charging terminals of the docking station.

Having such a docking station and locating formation configuration facilitates quick and simple charging simply by placing a robotic appliance on the shelf (e.g. in contrast to a system in which a charging plug has to be manually connected to a socket on each robotic appliance).

In exemplary embodiments, the docking station of each receiving space is located on the shelf such that a robotic appliance at least partly sits on the docking station when the robotic appliance is located on the shelf.

Such an arrangement provides a simple means to support the docking station in the receiving space and to couple a robot appliance with the docking station for charging. Furthermore, having the robotic appliance at least partly sitting on the docking station facilitates a good connection between the charging terminals of the docking station and the charging contacts of the robotic appliance, since gravity urges the robotic appliance (and its charging contacts) onto the docking station.

In exemplary embodiments, the one or more locating formations are configured to facilitate securing and/or location of the docking station on the shelf.

Having the one or more locating formations facilitate securing and/or location of the docking station on the shelf provides a simple means for positioning the docking stations within the receiving space (e.g. wedged between two parallel planar surfaces of the one or more locating formations to inhibit movement of the docking station e.g. to prevent movement of the docking station perpendicular to the parallel planar surfaces).

This also allows the docking station to be secured more easily via adhesive (e.g. rather than bolts or other fasteners which require structural changes to other components, such as fastening holes in the shelf) since the position is fixed to some extent by the locating formations.

In exemplary embodiments, the apparatus further comprises a power connector (e.g. a plug), wherein each of the charging elements are electrically coupled to the power connector.

Having each charging element electrically coupled to the power connector (e.g. rather than each charging element having an independent power connector such as a plug) allows a plurality of robotic appliances to be charged in a location with only a single electrical power outlet (e.g. socket).

In exemplary embodiments, the apparatus is configured to receive a single robotic appliance per receiving space.

Such a configuration keeps the width of each receiving space narrow (e.g. in contrast to having a plurality of robotic appliances on each shelf), which facilitates location of the apparatus in compact areas such as closets or wardrobes.

In exemplary embodiments, the receiving spaces are spaced apart and arranged generally one above another in a vertical direction.

Such a configuration keeps the width of each receiving space narrow (e.g. in contrast to having a plurality of robotic appliances on each shelf), which facilitates location of the apparatus in compact areas such as closets or wardrobes.

In exemplary embodiments, the apparatus is tilted with respect to a vertical axis, such that the shelf and an angle of tilt of the apparatus define a V-shape.

Such a configuration facilitates support of a robotic appliance located on the shelf.

In exemplary embodiments, each receiving space defines a forward end for loading and unloading of robotic appliances and a rearward end opposite the forward end, wherein the shelf of each receiving space is at least partially offset (e.g. in the rearward direction) from the shelf of an adjacent receiving space (e.g. the shelf below).

Having the shelf of each receiving space at least partially offset from the shelf of an adjacent receiving space facilitates easy access to the receiving spaces for loading/unloading of robotic appliances on the shelves. For example, the front of each shelf is not obscured by the front of a shelf above.

In exemplary embodiments, the apparatus comprises a support structure, wherein the shelf of each receiving space comprises a rearward portion supported by the support structure and a forward portion for loading and unloading of robotic appliances, wherein the forward portion projects forwards of the support structure.

In exemplary embodiments, the apparatus comprises a support structure, wherein the shelf of each receiving space is supported by the support structure.

In exemplary embodiments, the shelf of each receiving space comprises a rearward portion supported by the support structure and a forward portion for loading and unloading of robotic appliances, for example wherein the forward portion projects forwards of the support structure.

Having a forward portion which projects forwards of the support structure facilitates easy access to the receiving spaces for loading/unloading of robotic appliances on the shelves. For example, robotic appliances can be loaded from the side of the forward portions as well as from a front of the forward portions.

In exemplary embodiments, the one or more locating formations extend from the support structure.

Having the locating formations extend from a support structure of the apparatus (e.g. being welded to the support structure, formed by pressing or integrally cast) offers an alternative means for positioning the locating formations in the receiving space.

In exemplary embodiments, the shelf of each receiving space is entirely opaque.

In exemplary embodiments, the shelf of each receiving space defines a forward end for loading and unloading of robotic appliances, and wherein the forward end comprises a lip for inhibiting forwards movement of a robotic appliance positioned on the shelf.

Such a lip contributes to retaining a robotic appliance on the shelf (e.g. if the apparatus is tilted forwards during transporting).

In exemplary embodiments, the apparatus further comprises one or more wheels, rollers or friction-reducing elements for transporting the apparatus.

Having one or more wheels, rollers or friction-reducing elements allows the apparatus to easily be moved.

In exemplary embodiments, said one or more wheels, rollers or friction-reducing elements are detachable.

The wheels, rollers or friction-reducing elements being detachable allows easy manoeuvring of the apparatus when attached (e.g. for easy positioning in a desired charging location) and more compact/secure storage when detached (e.g. once apparatus is situated at the desired charging station).

In exemplary embodiments, the one or more wheels, rollers or friction-reducing elements are independently detachable.

In alternative embodiments, the one or more wheels, rollers or friction-reducing elements are connected to a chassis which is detachable from the rest of the apparatus (e.g. the support structure).

Such a configuration provides a simple means for detaching wheels or the like from the apparatus—i.e. only the chassis needs detaching rather than each individual wheel or the like.

According to a second aspect of the invention a system is provided, the system comprising a plurality of robotic appliances and an apparatus according to the first aspect of the invention; optionally, wherein the plurality of robotic appliances are robotic surface treatment appliances; optionally, wherein the plurality of robotic appliances are robotic vacuum cleaners.

Having a plurality of robotic appliances allows an area to be treated more quickly than would be possible with a single robotic appliance. Furthermore, having such an apparatus allows the robotic appliances to be easily stored, transported and/or charged when not in use.

It will be appreciated that the optional features described herein may apply to any aspect disclosed herein. All combinations contemplated are not recited explicitly for the sake of brevity.

DETAILED DESCRIPTION

Figure 1:
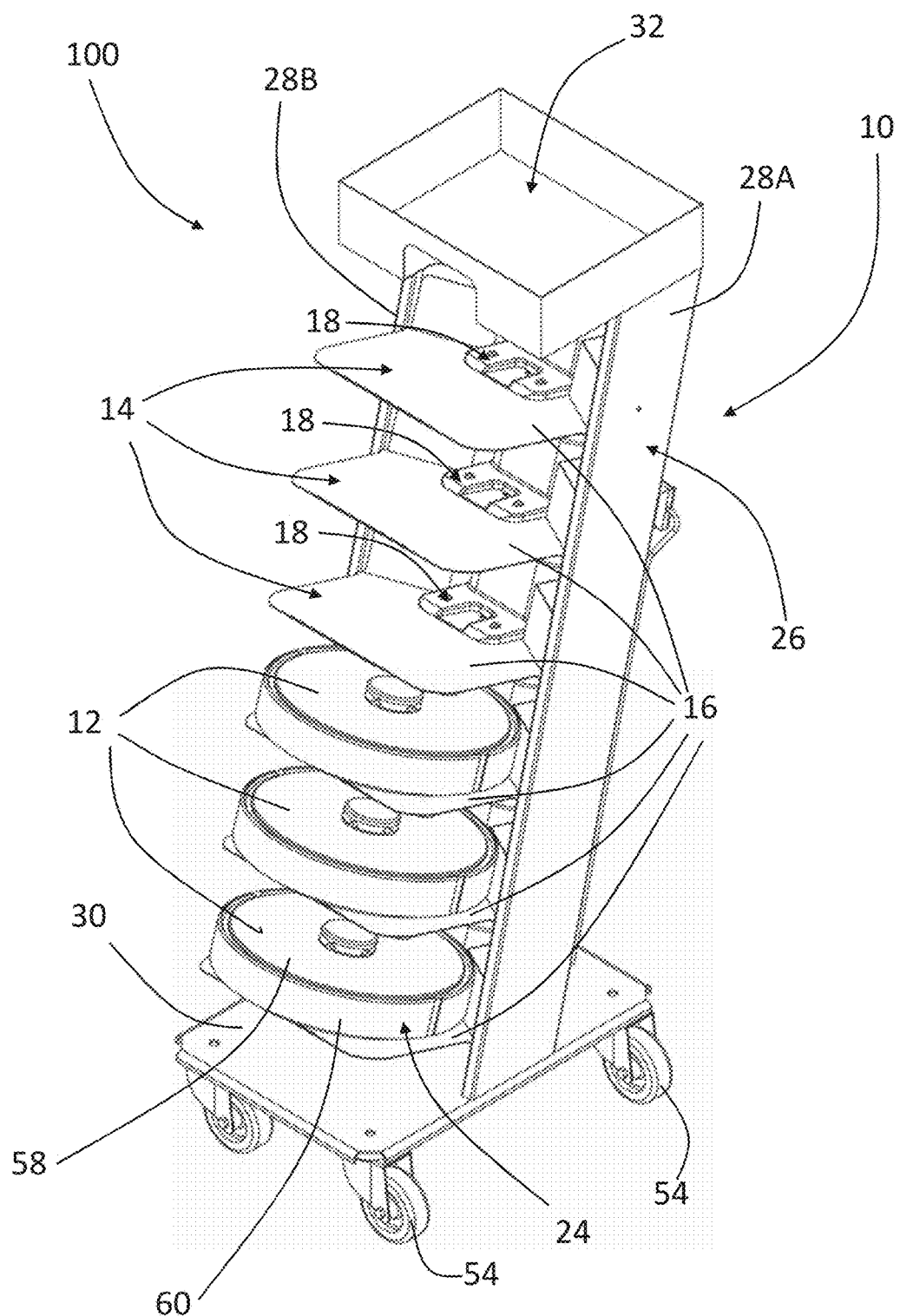
FIG. 1 is an isometric view of a system as disclosed herein, including a plurality of robotic appliances and an apparatus for use with the robotic appliances.

Referring to FIG. 1, a cleaning system is indicated at 100. The cleaning system 100 includes a plurality of robotic appliances 12 and an apparatus 10 for use with the robotic appliances 12. In the illustrated embodiment, the robotic appliances are robotic vacuum cleaners.

In alternative embodiments, the robotic appliances 12 are robotic surface treatment appliances such as: robotic scrubber dryers, robotic sanders, robotic polishers, or robotic painters. In alternative embodiments, the robotic appliances 12 are any other type of robotic appliance (e.g. a robotic appliance for search and rescue, simultaneous localisation and mapping, or robotic sports).

With reference to FIG. 1, the robotic appliances 12 include a body 24 having a circular profile. It will be appreciated that robotic appliances having profiles of other shapes may be used.

The body 24 includes a top surface 58, a bottom surface (not shown) and a side surface 60 extending therebetween. In some embodiments, the robotic appliance 12 comprises wheels (not shown) extending from the bottom surface for propulsion of the robotic appliance 12. In some embodiments, the robotic appliance 12 includes brushes, suction regions, and/or other surface treatment components (not shown).

As will be outlined in more detail below, the apparatus 10 is configured for storing, charging and transporting the robotic appliances 12. In alternative embodiments, the apparatus 10 is configured for only one or two of: storing, charging and transporting robotic appliances 12. For example, charging of the robotic appliances 12 may be omitted.

The apparatus 10 includes a plurality of receiving spaces 14 each for receiving one or more robotic appliances 12. In the illustrated embodiment, the apparatus 10 is configured to receive a single robotic appliance 12 per receiving space 14, and the receiving spaces 14 are spaced apart and arranged generally one above another in a vertical direction. Such a configuration keeps the width of each receiving space 14 narrow (e.g. in contrast to having a plurality of robotic appliances 12 in each receiving space), which facilitates location of the apparatus 10 in compact areas such as closets or wardrobes.

In alternative embodiments, the apparatus 10 may be configured to receive more than one robotic appliance 12 per receiving space 14.

In the illustrated embodiment, each receiving space 14 includes a shelf 16 having an upper surface on which a robotic appliance 12 can be located.

As will be described in more detail below, each receiving space 14 also includes a charging element 18 configured to charge a robotic appliance 12 when it is located on the shelf 16.

Figure 2:
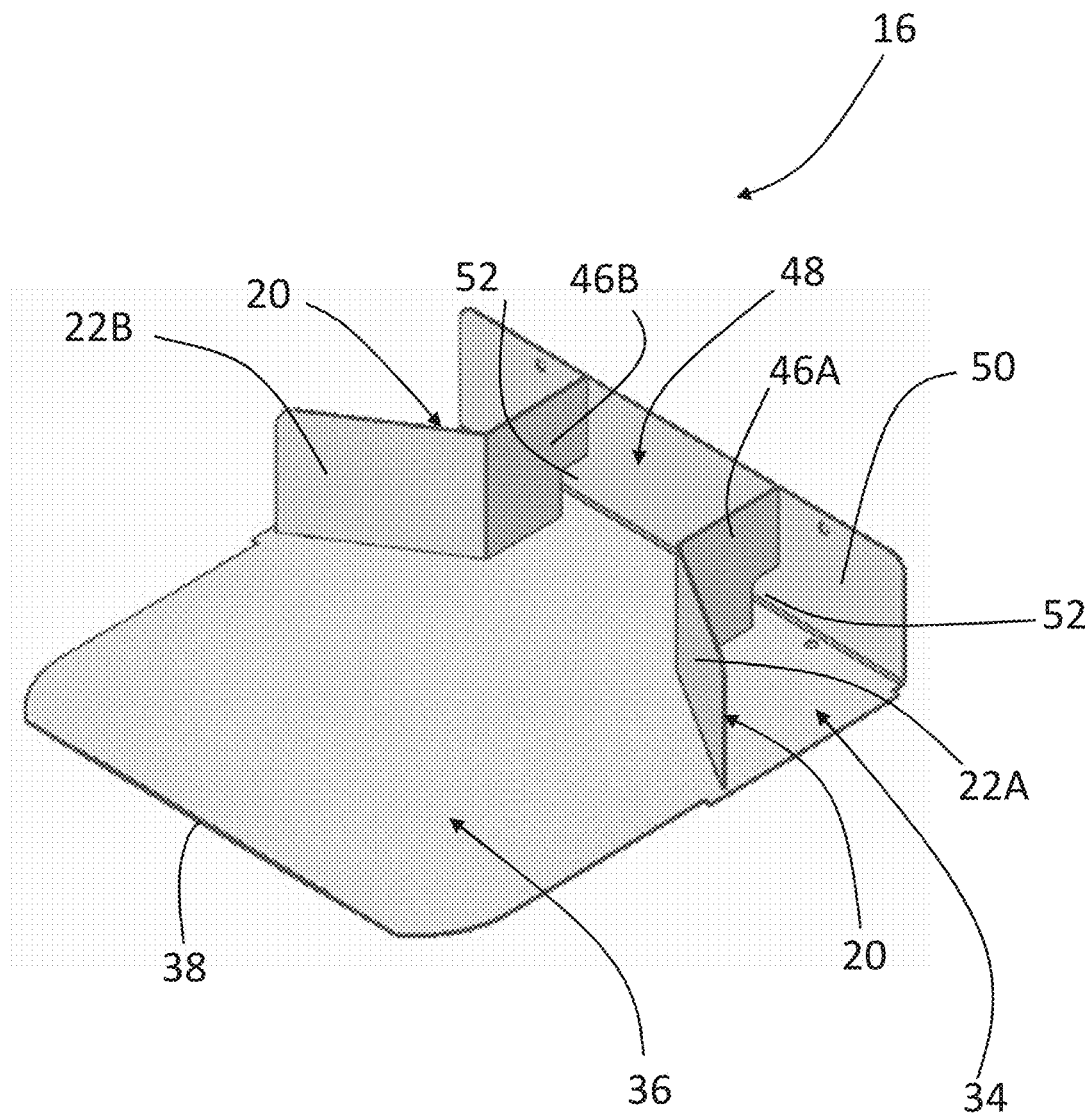
FIG. 2 is an isometric view of a shelf, locating formations and rear wall of a receiving space of the apparatus of FIG. 1.
Figure 3A:
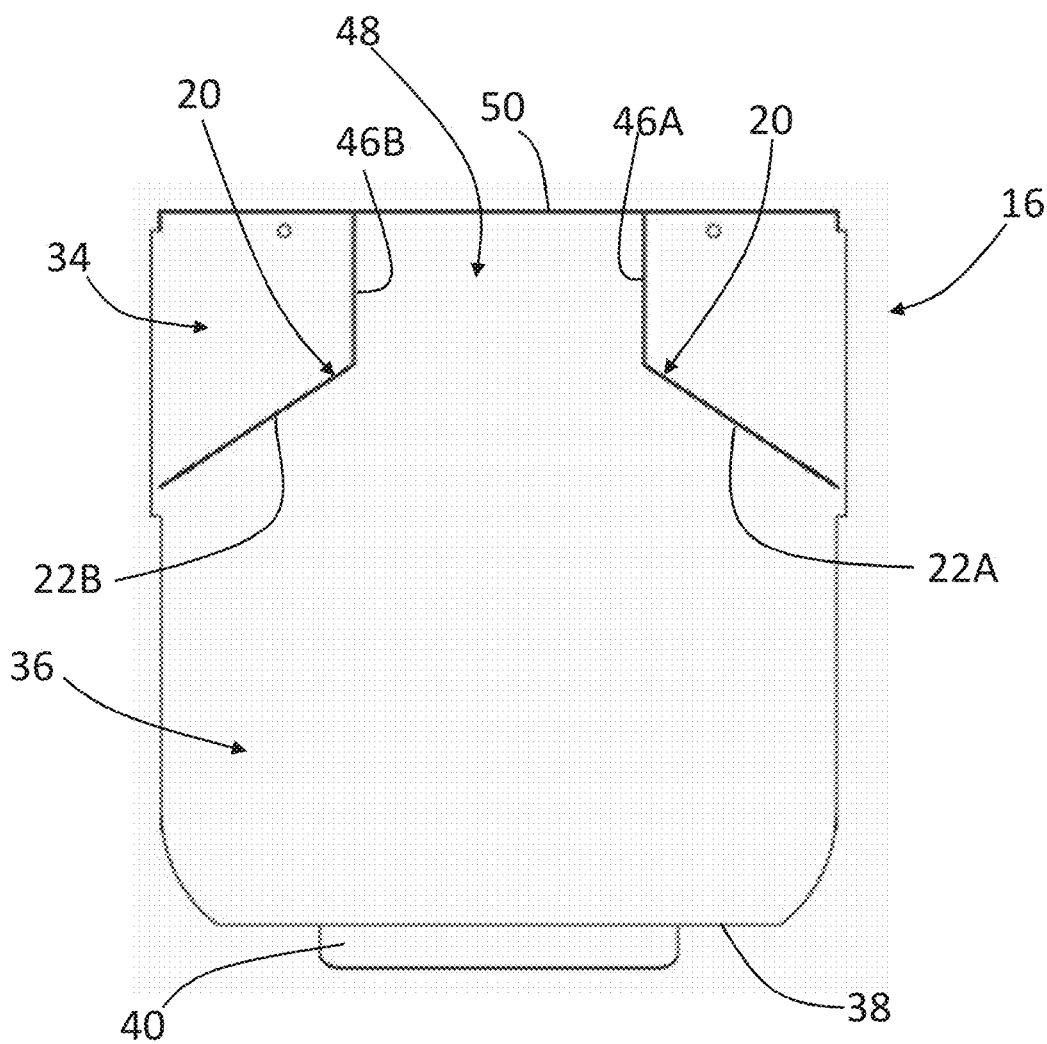
FIGS. 3*a* and 3*b* are plan and side views of the shelf, locating formations and rear wall of FIG. 2.
Figure 3B:
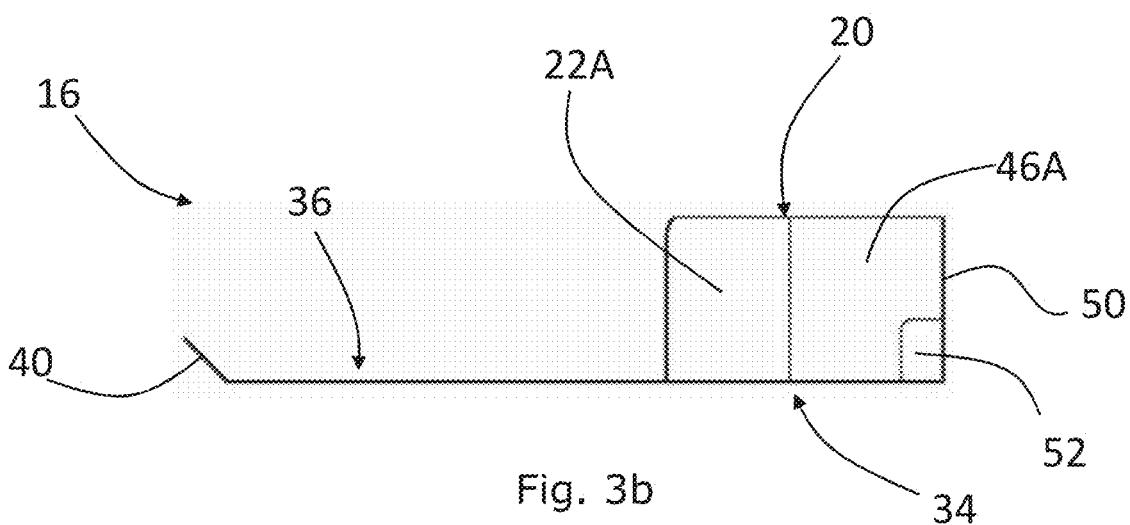

Referring now to FIGS. 2 to 3b, each receiving space 14 includes one or more locating formations 20 arranged to abut said robotic appliance 12, such that the one or more location formations 20 provide support against movement of the robotic appliance 12 when the robotic appliance 12 is located on the shelf 16. In particular, the illustrated embodiment includes two locating formations 20 per receiving space. In alternative embodiments, a single locating formation 20 or greater than two locating formations 20 are provided per receiving space 14.

Such locating formations 20 facilitate correct location of the robotic appliances 12 on the shelves 16, which reduces the chance of the robotic appliances 12 falling off, or being knocked/damaged. In addition, the locating formations 20 guard against sideways tipping of robotic appliances 12 to a greater extent that other locating arrangements (such as when a robotic appliance is located by apertures in the shelf). Such locating formations 20 are also not necessarily dependent on a particular robot model/configuration or wheel position (compared to a configuration in which a robotic appliance 12 is located by apertures in a shelf).

In the illustrated embodiment, the locating formations 20 of each receiving space 14 extend from an upper surface of the shelf 16 (e.g. they are welded to the upper surface of the shelf 16 or integrally formed with the shelf 16). This offers a simple means for positioning the locating formations 20 in the receiving space 14.

In alternative embodiments, the locating formations 20 extend or are suspended from a different surface, such as a supporting structure or an underside of a shelf 16 above. In such embodiments, the locating formations 20 may be provided above the upper surface of the shelf 16 (e.g. they may be spaced apart from the upper surface of the shelf 16).

n the illustrated embodiment, the locating formations 20 are provided as walls extending substantially perpendicular to the shelf 16. In alternative embodiments, the locating formations are one or more of: a rail projecting from a surface, a guide rail spaced apart from an upper surface of the shelf and configured to abut a robotic appliance 12, or any other suitable formation.

As will be described in more detail below, the locating formations 20 are configured to abut a robotic appliance 12 located in the receiving space 14 at a plurality of contact points. This facilitates locating the robotic appliance 12 in more than one direction (e.g. both lateral and longitudinal directions) on the shelf 16.

In the illustrated embodiment, the robotic appliances 12 have a circular profile and the plurality of contact points are spaced apart by 180 degrees or less with respect to a central point of the circular profile.

In exemplary embodiments, the plurality of contact points are spaced apart from each other by an angle in the range of 45 degrees to 135 degrees with respect to a central point of the circular profile (e.g. 60 degrees). Such a configuration has been found to facilitate particularly effective location of the robotic appliance 12 on the shelf 16, whilst enabling easy loading and unloading of the robotic appliances 12.

n the illustrated embodiment, the locating formations 20 each have a planar surface 22A, 22B for abutment with the robotic appliance 12. Having a planar surface allows any shape of robotic appliance 12 to abut against the planar surface 22A, 22B (e.g. as opposed to a locating formation which is specifically curved/shaped/contoured to match a profile of a particular robotic appliance).

The planar surfaces 22A, 22B of the locating formations 20 are arranged at an angle between 0 and 180 degrees to each other. In exemplary embodiments, the planar surfaces are arranged at an angle between 90 and 150 degrees to each other (e.g. approximately 120 degrees in the illustrated embodiment). Having two planar surfaces 22A, 22B arranged at such angles to each other has been found to be effective for locating a robotic appliance 12, whilst enabling easy loading and unloading of the robotic appliances 12. Furthermore, such angled planar surfaces 22A, 22B have been found to be effective for locating robotic appliances 12 of different sizes/shapes/configurations (e.g. circular robotic appliances 12 with smaller or larger diameters).

In alternative embodiments, at least one locating formation is curved to correspond to a portion of a circumference of the circular profile of the robotic appliance 12. In such embodiments, the locating formation may define an arc with a central angle of 180 degrees or less (e.g. in the range of 45 to 135 degrees). Alternatively, a plurality of curved locating formations are provided, each locating formation defining an arc with a central angle of 90 degrees or less.

In the illustrated embodiment, the locating formations 20 are configured to abut a body 24 of the robotic appliance 12, e.g. a side wall or top surface of the robotic appliance 12. This provides a simple and more effective means for locating a robotic appliance 12 and supporting against movement (e.g. as opposed to alternative arrangements in which a wheel or other smaller component of the robotic appliance 12 has to be aligned with a locating formation or aperture). In alternative embodiments, the locating formations 20 are configured to abut one or more wheels or other smaller components of the robotic appliance 12.

Figure 4:
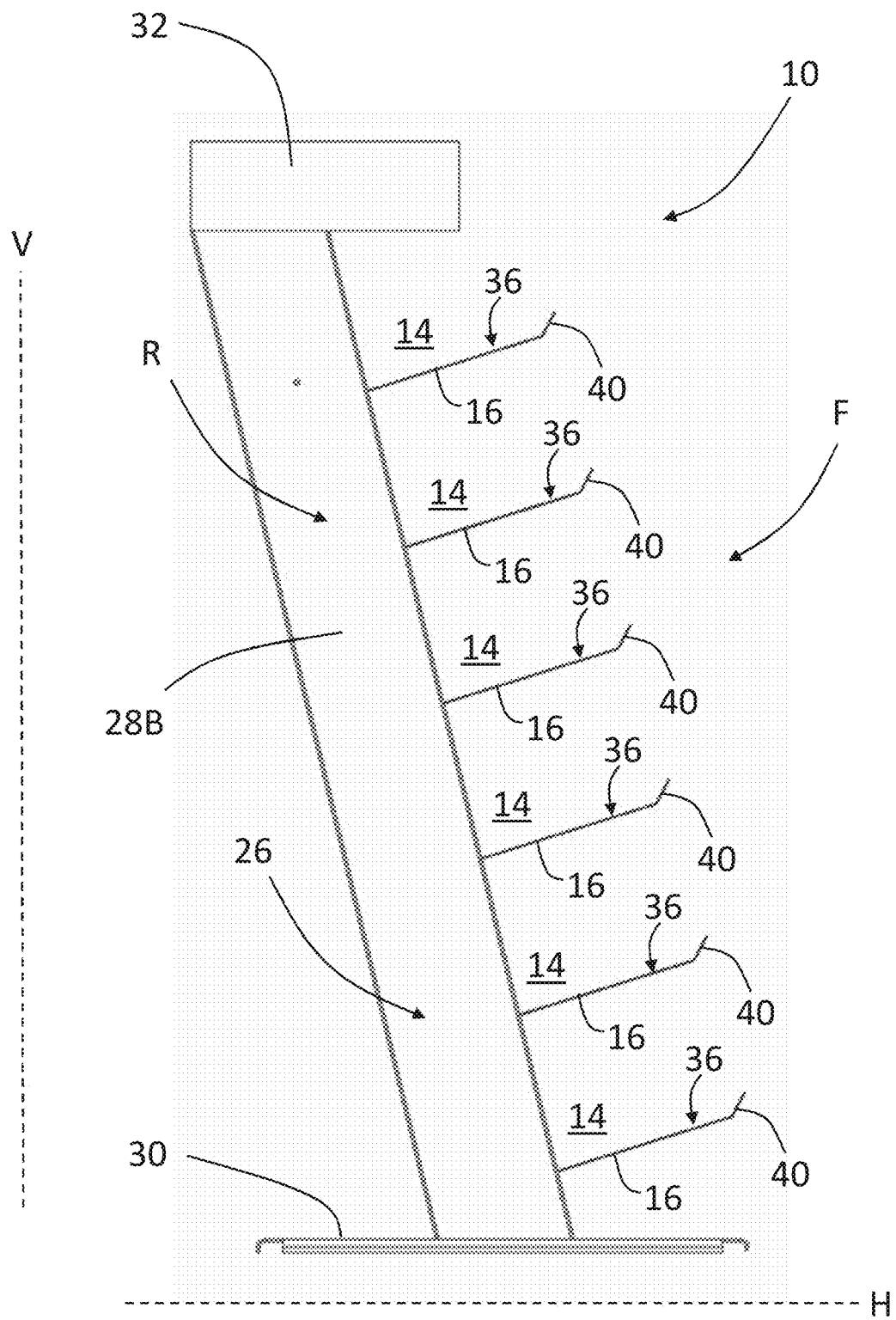
FIG. 4 is a side view of the apparatus of FIG. 1 with the wheels detached.
Figure 5:
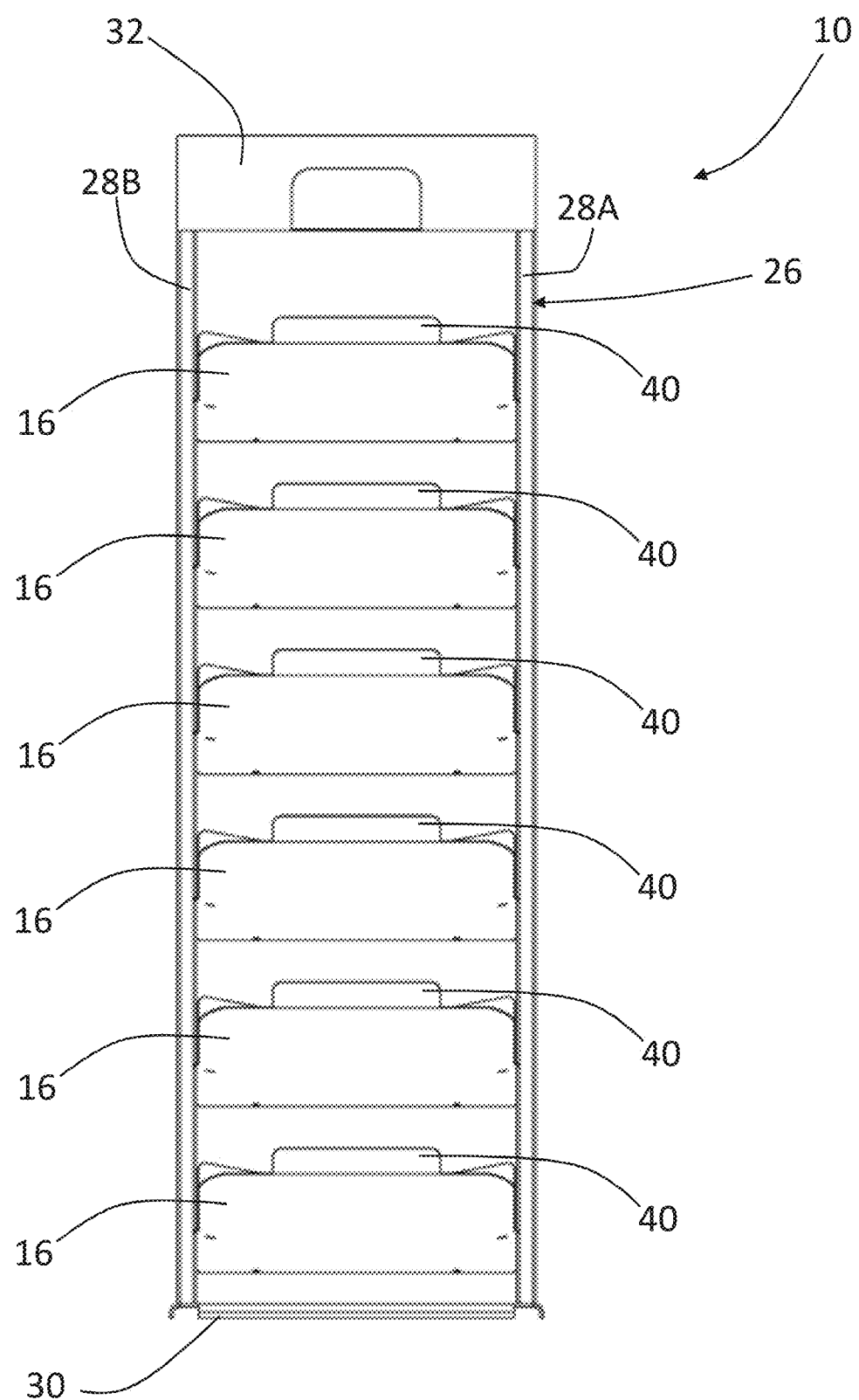
FIG. 5 is a front view of the apparatus of FIGS. 1 and 4 with the wheels detached.

Referring now to FIGS. 4 and 5, each shelf 16 is angled relative to a horizontal plane H when the apparatus 10 is positioned on a horizontal surface. Having an angled shelf 16 ensures that a robotic appliance 12 located on the shelf is urged downwards under the force of gravity. This inhibits the robotic appliance 12 from falling off an upper end of the shelf 16.

It will be understood that the locating formations 20 of each receiving space 14 are positioned such that a robotic appliance 12 located on the angled shelf 16 of the receiving space 14 is urged towards the locating formations 20 by gravity. In this way, the robotic appliance 12 located on the angled shelf 16 rests against the locating formations 20 under gravity. This ensures that the robotic appliance 12 contacts the locating formations 20 and is correctly positioned on the shelf 16 and/or supported against movement, without the need for a user to actively position the robotic appliance 12 against the locating formations 20.

As best illustrated in FIG. 4, the apparatus 10 is tilted with respect to a vertical axis V, such that each shelf 16 and an angle of tilt of the apparatus 10 define a V-shape. Such a configuration facilitates support of a robotic appliance located on the shelf.

Each receiving space 14 defines a forward end (indicated generally by the arrow F on FIG. 4) for loading and unloading of robotic appliances 12 and a rearward end (indicated generally by the arrow R on FIG. 4) opposite the forward end.

In the illustrated embodiment, the shelf 16 of each receiving space 14 is at least partially offset (e.g. in the rearward direction) from the shelf 16 of an adjacent receiving space 14 (e.g. a shelf below). Having the shelf 16 of each receiving space 14 at least partially offset from the shelf 16 of an adjacent receiving space 14 facilitates easy access to the receiving spaces 14 for loading/unloading of robotic appliances 12 on the shelves 16. For example, the front of each shelf 16 is not obscured by the front of a shelf 16 above.

In alternative embodiments, the shelves 16 are arranged such that they are not offset from each other (e.g. the front of each shelf 16 is aligned with the front of the other shelves 16).

The apparatus 10 includes a support structure 26. In the illustrated embodiment, the support structure 26 includes side panels 28A and 28B which are each connected to a base plate 30 and a top box 32 (i.e. the side panels 28A, 28B, base plate 30 and top box 32 define a frame). As well as forming part of the support structure 26, the top box 32 also acts as a container for spare parts, cleaning products, chargers, or other accessories which may be used with the system 100.

In alternative embodiments, a different support structure 26 is used. For example, the support structure 26 may be formed of bars rather than plates.

In the illustrated embodiment, the shelf 16 of each receiving space 14 includes a rearward portion 34 supported by the support structure 26 and a forward portion 36 for loading and unloading of robotic appliances. As best illustrated in FIG. 4, the forward portions 36 project forwards of the support structure 26. Having a forward portion 36 which projects forwards of the support structure 26 facilitates easy access to the receiving spaces 14 for loading/unloading of robotic appliances 12 on the shelves 16. For example, robotic appliances 12 can be loaded from the side of the forward portions 36 as well as from a front of the forward portions 36.

In alternative embodiments, the shelves 16 are supported differently on the support structure 26. For example, both the rear and front portions 34, 36 may be supported by the support structure 26, just the front portions 36 may be supported by the support structure 26, and/or middle portions of the shelves 16 may be supported by the support structure 26.

As well as supporting the shelves 16, the support structure 26 may support one or more locating formations 20 (e.g. in embodiments where the locating formations 20 do not extend from the upper surface of the shelves 16).

Referring now to FIGS. 3a to 5, the shelf 16 of each receiving space 14 defines a forward end 38 for loading and unloading of robotic appliances 12. The forward end 38 includes a lip 40 for inhibiting forwards movement of a robotic appliance 12 positioned on the shelf 16. Such a lip 40 contributes to retaining a robotic appliance 12 on the shelf (e.g. if the apparatus 10 is tilted forwards during transporting).

In the illustrated embodiment, the lip 40 is integrally formed with the shelf 16 (e.g. bent from the same piece of sheet material). In alternative embodiments, the lip 40 is a separate component attached to the shelf 16.

In the illustrated embodiment, the lip 40 extends across a part of the width of the shelf 16 (i.e. not across the full width of the shelf 16). In alternative embodiments, the lip 40 extends across the full width of the shelf 16.

Figure 6:
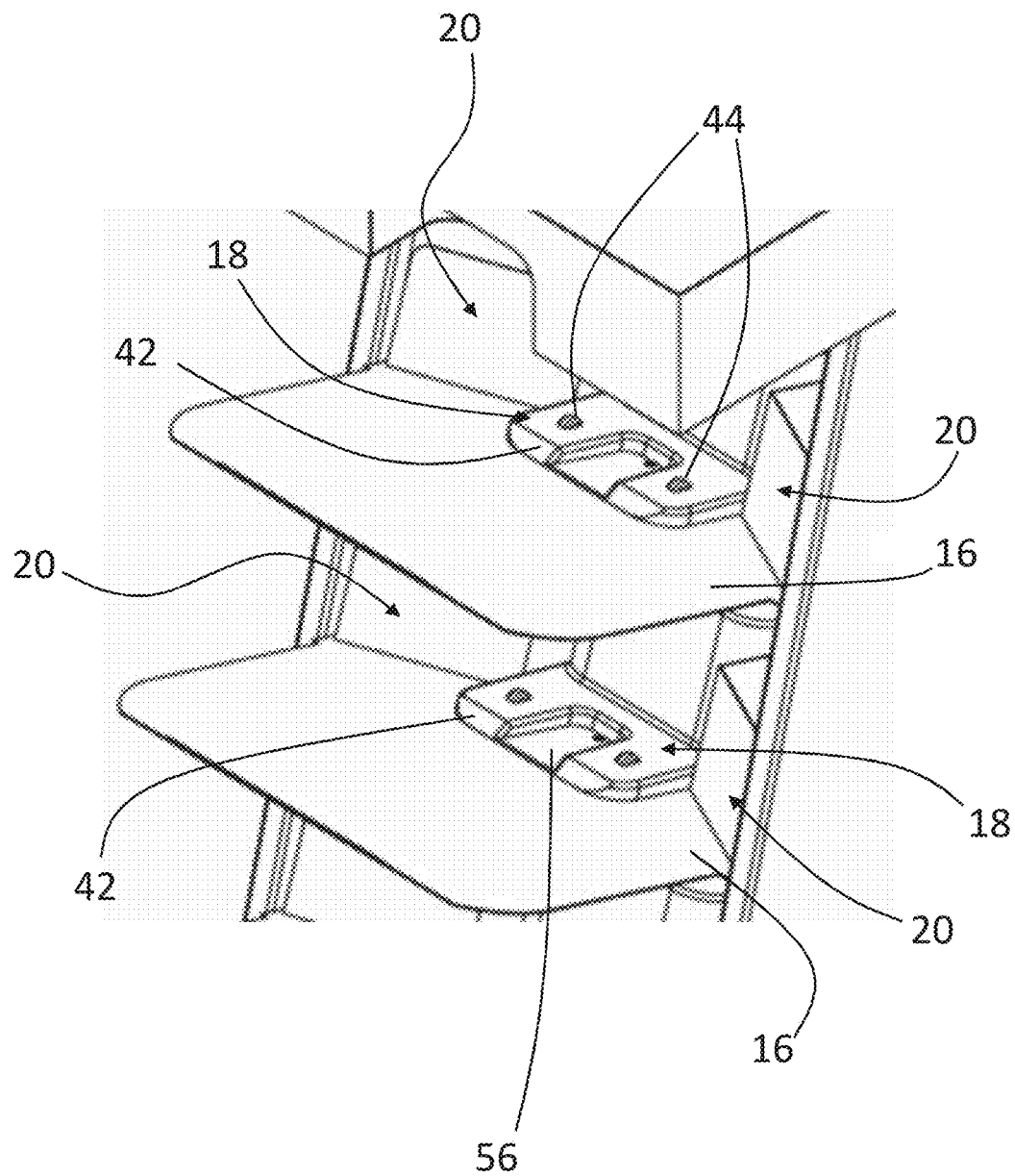
FIG. 6 is a partial isometric view of a portion of the apparatus of FIGS. 1, 4 and 5.

Referring now to FIG. 6, the charging element 18 of each receiving space 14 includes a docking station 42 having one or more charging terminals 44 for contact with one or more charging contacts of a robotic appliance 12. In the illustrated embodiment, two charging terminals 44 are provided per docking station 44.

The locating formations 20 are arranged for locating a robotic appliance 12 such that the charging contacts of the robotic appliance 12 are in contact with the respective charging terminals 44 of the docking station 42.

Having such a docking station 42 and locating formation 20 configuration facilitates quick and simple charging simply by placing a robotic appliance 12 on the shelf (e.g. in contrast to a system in which a charging plug has to be manually connected to a socket on a robotic appliance).

In the illustrated embodiment, the docking station 42 of each receiving space 14 is located on the shelf 16 such that a robotic appliance 12 at least partly sits on the docking station 42 when the robotic appliance 12 is located on the shelf 16. Such an arrangement provides a simple means to couple a robot appliance 12 with the docking station 42 for charging. Furthermore, having the robotic appliance 12 at least partly sitting on the docking station 42 facilitates a good connection between the charging terminals 44 of the docking station 42 and the charging contacts of the robotic appliance 12, since gravity urges the robotic appliance 12 (and its charging contacts) onto the docking station 12.

Referring to FIGS. 1, 2 and 3a, the locating formations 20 are also configured to facilitate securing and/or location of the docking station 42 of each receiving space 14 on the shelf 16. Having the locating formations 20 facilitate securing and/or location of the docking station 42 on the shelf 16 provides a simple means for positioning the docking stations 42 within the receiving space 14. This also allows the docking station 42 to be secured more easily via adhesive (e.g. rather than bolts or other fasteners which require structural changes to other components, such as fastening holes in the shelf), since the position is fixed to some extent by the locating formations 20.

In the illustrated embodiment, the locating formations 20 include a pair of retaining walls 46A, 46B which define a retaining channel 48 therebetween. When assembled, the docking station 42 is located within the retaining channel 48. In this way, the retaining walls 46A, 46B prevent lateral movement of the docking station 42 on the shelf 16.

In the illustrated embodiment, the retaining walls 46A, 46B are integrally formed with the planar surfaces 22A, 22B of the locating formations 20 (e.g. via bending a piece of plate metal to form a planar surface 22A, 22B and a retaining wall 46A, 46B). In alternative embodiments, the retaining walls 46A, 46B are distinct elements separate from the planar surfaces 22A, 22B (e.g. distinct elements touching or spaced apart from the planar surfaces 22A, 22B).

In alternative embodiments, other types of locating formations 20 are provided to locate the docking station 42 on the shelf 16 (e.g. other types of rails or projections).

In the illustrated embodiment, each shelf 16 also includes a rear wall 50. The rear wall 50 acts as a further retaining wall for the docking station 42, which prevents rearwards movement of the docking station 42 received in the retaining channel 48.

In embodiments where the locating formations 20 do not extend from the upper surface of the shelf 16, the locating formations 20 may instead extend from the rear wall 50.

In some embodiments, the rear wall 50 is a locating formation 20 and the retaining walls 46A, 46B and planar surfaces 22A, 22B are removed entirely. In such embodiments, a robotic appliance 12 located on a shelf 16 may rest against the rear wall 50.

In the illustrated embodiment, the retaining walls 46A, 46B extend from the rear wall 50 (e.g. they are welded to the rear wall 50).

In the illustrated embodiment, the rear wall 50 is integrally formed with the shelf 16 (e.g. bent from the same piece of sheet material). In alternative embodiments, the rear wall 50 is a separate component attached to the shelf 16.

In the illustrated embodiment, the rear wall 50 extends across the full width of the shelf 16. In alternative embodiments, the rear wall 50 extends across only part of the width of the shelf 16 (e.g. a central third of the width, e.g. between the retaining walls 46A, 46B).

In exemplary embodiments, the apparatus 10 includes a power connector (e.g. a plug), and each of the charging elements 18 are electrically coupled to the power connector. Having each charging element 18 electrically coupled to the power connector (e.g. rather than each charging element 18 having an independent power connector such as a plug) allows a plurality of robotic appliances 12 to be charged in a location with only a single electrical power outlet (e.g. socket).

In alternative embodiments, each charging element 18 has a dedicated power connector.

In the illustrated embodiment, the retaining walls 46A, 46B also include an opening 52, which acts as a passage for a charging cable connecting the docking station 42 of the receiving space 14 to a power connector. In alternative embodiments, the retaining walls 46A, 46B are spaced apart from the rear wall to provide the same function. In alternative embodiments, an opening is provided in the rear wall 50, or the rear wall 50 is omitted entirely to act as a passage for a charging cable. In alternative embodiments, a charging cable passes over the retaining walls 46A, 46B and/or the rear wall 50.

Referring again to FIG. 1, the apparatus 10 includes four wheels 54 for transporting the apparatus. In alternative embodiments, the apparatus 10 includes more or less than four wheels 54, and/or the apparatus 10 includes one or more rollers or friction-reducing elements for transporting the apparatus 10. Having one or more wheels 54, rollers or friction-reducing elements allows the apparatus 10 to easily be moved.

In exemplary embodiments, the one or more wheels 54, rollers or friction-reducing elements are detachable (e.g. as illustrated in FIGS. 4 and 5). The wheels 54, rollers or friction-reducing elements being detachable allows easy manoeuvring of the apparatus 10 when attached (e.g. for easy positioning in a desired charging location) and more compact/secure storage when detached (e.g. once the apparatus 10 is situated at the desired charging station).

In the illustrated embodiment, the wheels 54 are independently detachable. In particular, each wheel 54 is part of a castor which is detachable from base plate 30.

In alternative embodiments, the one or more wheels 54, rollers or friction-reducing elements are connected to a chassis which is detachable from the rest of the apparatus 10 (e.g. the support structure 26). Such a configuration provides a simple means for detaching wheels 54 or the like from the apparatus 10—i.e. only the chassis needs detaching rather than each individual wheel 54 or the like.

In the illustrated embodiment, the shelf 16 of each receiving space 14 is entirely opaque.

In exemplary embodiments, the shelves 16 and/or support structure 26 are formed of a metallic material (e.g. sheet metal). In such embodiments, the shelf 16 may be coated for aesthetic purposes and/or to prevent rust or other degradation of the metallic material.

In use, a robotic appliance 12 is positioned on a shelf 16 of the apparatus 100. Due to the rearward incline of the shelf 16, the robotic appliance 12 is urged towards the rearward portion 34 of the shelf 16 under gravity such that the side wall 60 of the robotic appliance abuts the locating formations 20.

As will be appreciated from the Figures, the robotic appliance 12 abuts the first planar surface 22A at a first contact point and abuts the second planar surface 22B at a second contact point. The spaced apart nature of the contact points, as well as the incline of the shelf 16, acts to support the robotic appliance 12 against movement, and retain the robotic appliance on the shelf 12, particularly when the apparatus is being moved.

As the robotic appliance 12 is urged towards the rearward portion 34 of the shelf 16 under gravity, the robotic appliance 12 extends over the docking station 18, such that electrical contacts of the robotic appliance 12 come into contact with charging terminals 44 of the docking station 18.

In some embodiments, a wheel (not shown) of the robotic appliance 12 occupies a gap 56 between the contact terminals 44, to facilitate contact between the electrical contacts of the robotic appliance 12 and the charging terminals 44 of the docking station 18.

When the robotic appliance 12 is required for use, it is simply lifted off the shelf 16. No unplugging or detachment is required.

Although the invention has been described in relation to one or more embodiments, it will be appreciated that various changes or modifications can be made without departing from the scope of the invention as defined in the appended claims. It will be appreciated that the locating formations disclosed herein can be thought of as "supporting formations".

The invention claimed is:

1. A robotic vacuum cleaner storage and charging apparatus comprising a plurality of receiving spaces each configured to receive at least one robotic vacuum cleaner, wherein each of the receiving spaces comprises:

a shelf comprising an upper surface on which a robotic vacuum cleaner can be located;

a charging element configured to charge a robotic vacuum cleaner when it is located on the shelf;

one or more locating formations arranged to abut said robotic vacuum cleaner, such that the one or more locating formations provide support against movement of the robotic vacuum cleaner when the robotic vacuum cleaner is located on the shelf, wherein the one or more locating formations are provided at or above the upper surface of said shelf, and a frame comprising one or more side panels, bars or plates to which the shelf of each of the receiving spaces is attached and supported by;

wherein the receiving spaces are spaced apart and arranged generally one above another in a vertical direction;

wherein the shelf of each receiving space defines a forward end for loading and unloading of the robotic vacuum cleaner and a rearward end opposite the forward end, wherein the shelf of each receiving space is fixed to the frame such that the forward end is at least partially offset in a rearward direction from the forward end of the shelf of an adjacent receiving space.

2. An apparatus according to claim 1, wherein the one or more locating formations extend from an upper surface of the shelf or wherein the one or more locating formations extend from an underside of a shelf above.

3. An apparatus according to claim 1, wherein the one or more locating formations are configured to abut the robotic vacuum cleaner at a plurality of contact points; optionally, wherein the robotic vacuum cleaner comprises a circular profile and the plurality of contact points are spaced apart by 180 degrees or less with respect to a central point of the circular profile; optionally, wherein the plurality of contact points are spaced apart from each other by an angle in a range of 45 degrees to 135 degrees with respect to a central point of the circular profile.

4. An apparatus according to claim 1, wherein the one or more locating formations comprise a planar surface for abutment with the robotic vacuum cleaner.

5. An apparatus according to claim 4, wherein the one or more locating formations define a pair of planar surfaces arranged at an angle between 0 and 180 degrees to each other; optionally, wherein the one or more locating formations define a pair of planar surfaces arranged at an angle between 90 and 150 degrees to each other.

6. An apparatus according to claim 1, wherein the robotic vacuum cleaner comprises a circular profile and wherein at least one locating formation is curved to correspond to a portion of a circumference of the circular profile;
optionally, wherein the at least one curved locating formation defines an arc with a central angle of 180 degrees or less, optionally in a range of 45 to 135 degrees; and/or
optionally, wherein the apparatus comprises a plurality of curved locating formations, optionally wherein each curved locating formation defines an arc with a central angle of 90 degrees or less.

7. An apparatus according to claim 1, wherein the one or more locating formations are configured to abut a body of the robotic appliance, e.g. a side wall or top surface of the robotic vacuum cleaner appliance.

8. An apparatus according to claim 1, wherein each shelf is angled relative to a horizontal plane when the apparatus is positioned on a horizontal surface; optionally, wherein the one or more locating formations are positioned such that a robotic appliance located on said angled shelf is urged towards said one or more locating formations by gravity.

9. An apparatus according to claim 1, wherein the charging element of each receiving space comprises a docking station having one or more charging terminals, and wherein the one or more locating formations are arranged for locating a robotic appliance such that one or more charging contacts of the robotic appliance are in contact with the one or more charging terminals of the docking station; optionally, wherein the docking station of each receiving space is located on the shelf such that a robotic appliance at least partly sits on the docking station when the robotic appliance is located on the shelf.

10. An apparatus according to claim 9, wherein the one or more locating formations are configured to facilitate securing and/or location of the docking station on the shelf.

11. An apparatus according to claim 1, wherein the apparatus is configured to receive a single robotic appliance per receiving space.

12. An apparatus according to claim 1, wherein the apparatus is tilted with respect to a vertical axis, such that the shelf and an angle of tilt of the apparatus define a V-shape.

13. An apparatus according to claim 1, wherein the apparatus comprises a support structure, wherein the shelf of each receiving space comprises a rearward portion supported by the support structure and a forward portion for loading and unloading of robotic appliances, wherein the forward portion projects forwards of the support structure.

14. An apparatus according to claim 1, wherein the shelf of each receiving space is entirely opaque.

15. An apparatus according to claim 1, wherein the shelf of each receiving space defines a forward end for loading and unloading of robotic appliances, and wherein the forward end comprises a lip for inhibiting forwards movement of a robotic appliance positioned on the shelf.

16. An apparatus according to claim 1, further comprising one or more wheels, rollers or friction-reducing elements for transporting the apparatus; optionally, wherein said one or more wheels, rollers or friction-reducing elements are detachable.

17. A system comprising a plurality of robotic appliances and an apparatus according to claim 1; optionally, wherein the plurality of robotic appliances are robotic surface treatment appliances; optionally, wherein the plurality of robotic appliances are robotic vacuum cleaners.

18. A robotic vacuum cleaner storage apparatus comprising a plurality of receiving spaces each configured to receive at least one robotic vacuum cleaner, wherein each of the receiving spaces comprises:

a shelf comprising a forward end for loading and unloading of robotic vacuum cleaners, a rearward end opposite the forward end, and an angled upper surface on which a robotic vacuum cleaner can be located, wherein the angled upper surface of the shelf is angled downwards from the forward end to the rearward end relative to a horizontal plane when the apparatus is positioned on a horizontal surface; and one or more locating formations extending transverse to the upper surface of the shelf, wherein the one or more locating formations are positioned such that a robotic vacuum cleaner located on said angled upper surface of the shelf is urged down the angled upper surface towards the one or more locating formations by gravity and thereby located on the shelf by the one or more locating formations.

19. A robotic vacuum cleaner storage and charging apparatus comprising a plurality of receiving spaces each configured to receive at least one robotic vacuum cleaner, wherein each of the receiving spaces comprises:

a shelf comprising an upper surface on which a robotic vacuum cleaner can be located;

a charging element configured to charge a robotic vacuum cleaner when it is located on the shelf;

one or more locating formations arranged to abut said robotic vacuum cleaner, such that the one or more locating formations provide support against movement of the robotic vacuum cleaner when the robotic vacuum cleaner is located on the shelf, wherein the one or more locating formations are provided at or above the upper surface of said shelf;

a frame comprising one or more side panels, bars or plates to which the shelf of each of the receiving spaces is attached and supported by; and a plurality of wheels, rollers or friction-reducing elements attached to a base of the frame, for transporting the apparatus.

20. A robotic vacuum cleaner storage and charging apparatus comprising a plurality of receiving spaces each configured to receive at least one robotic vacuum cleaner, wherein each of the receiving spaces comprises:

a shelf comprising an upper surface on which a robotic vacuum cleaner can be located;

a charging element configured to charge the robotic vacuum cleaner when it is located on the shelf;

one or more locating formations arranged to abut said robotic vacuum cleaner, such that the one or more locating formations provide support against movement of the robotic vacuum cleaner when the robotic vacuum cleaner is located on the shelf, wherein the one or more locating formations are provided at or above the upper surface of said shelf;

wherein the one or more locating formations comprise a pair of walls configured to abut a robotic vacuum cleaner located in the receiving space at a plurality of contact points for locating said robotic vacuum cleaner in lateral and longitudinal directions on the shelf, wherein each of the pair of walls has an inboard end, wherein the inboard ends of the pair of walls are spaced apart from each other to define a retaining channel therebetween, and wherein the charging element is located and retained within the retaining channel by the one or more locating formations.

* * * * *